US010262544B2

(12) United States Patent
Shamasundar et al.

(10) Patent No.: US 10,262,544 B2
(45) Date of Patent: Apr. 16, 2019

(54) SYSTEM AND METHOD FOR ADAPTIVE RENDERING MESSAGE REQUESTS ON A VERTICAL DISPLAY

(71) Applicant: Honeywell International Inc., Morris Plains, NJ (US)

(72) Inventors: Raghu Shamasundar, Bangalore (IN); Thomas D. Judd, Woodinville, WA (US)

(*) Notice: Subject to any disclaimer, the term of this patent is extended or adjusted under 35 U.S.C. 154(b) by 0 days.

(21) Appl. No.: 15/439,532

(22) Filed: Feb. 22, 2017

(65) Prior Publication Data

US 2018/0240347 A1 Aug. 23, 2018

(51) Int. Cl.
| | |
|---|---|
| *G08G 5/00* | (2006.01) |
| *G06F 3/0481* | (2013.01) |
| *G06F 3/0482* | (2013.01) |
| *G08G 5/04* | (2006.01) |

(52) U.S. Cl.
CPC ......... *G08G 5/0021* (2013.01); *G06F 3/0482* (2013.01); *G06F 3/04817* (2013.01); *G08G 5/0013* (2013.01); *G08G 5/0026* (2013.01); *G08G 5/0034* (2013.01); *G08G 5/0039* (2013.01); *G08G 5/0047* (2013.01); *G08G 5/0073* (2013.01); *G08G 5/045* (2013.01)

(58) Field of Classification Search
CPC ............................ G08G 5/0021; G06T 19/006
See application file for complete search history.

(56) References Cited

U.S. PATENT DOCUMENTS

| | | | |
|---|---|---|---|
| 6,154,151 A | 11/2000 | McElreath et al. | |
| 6,828,921 B2 | 12/2004 | Brown et al. | |
| 7,783,393 B2 | 8/2010 | Tucker et al. | |
| 8,014,907 B2 | 9/2011 | Coulmeau | |
| 8,229,659 B2 | 7/2012 | Judd et al. | |
| 8,285,427 B2 | 10/2012 | Rogers et al. | |
| 8,554,394 B2 | 10/2013 | Shamasundar | |
| 8,843,250 B2 | 9/2014 | Tucker et al. | |
| 9,202,382 B2* | 12/2015 | Klinger | G08G 1/162 |

(Continued)

FOREIGN PATENT DOCUMENTS

| | | |
|---|---|---|
| EP | 2696171 A2 | 2/2014 |
| EP | 2801965 A2 | 11/2014 |

OTHER PUBLICATIONS

European Patent Office, "Extended European Search Report for EP Application No. 18157215.7 dated Jun. 15, 2018", "Foreign Counterpart to U.S. Appl. No. 15/439,532", dated Jun. 15, 2018, pp. 1-8, Published in: EP.

*Primary Examiner* — Alex C Dunn

(74) *Attorney, Agent, or Firm* — Fogg & Powers LLC

(57) ABSTRACT

In one embodiment, a method is provided. The method comprises: obtaining data; generating complete travel plan; determining at least one of: one or more current travel conditions and one or more future travel conditions; automatically generating at least one proposed message based upon the at least one of one or more current travel conditions and one or more future travel conditions; rendering one icon, for each of the at least one proposed message, on a grid having a first axis specifying altitude and a second axis specifying one of distance and time; and wherein each of the at least one proposed message is configured to be at least one of selectable, reviewable, printable, editable, and sendable.

20 Claims, 8 Drawing Sheets

(56) References Cited

U.S. PATENT DOCUMENTS

| | | |
|---|---|---|
| 9,349,295 B2 | 5/2016 | Dorneich et al. |
| 2006/0026030 A1* | 2/2006 | Jacobs ................ G06Q 10/025 705/26.1 |
| 2009/0150012 A1 | 6/2009 | Agam et al. |
| 2010/0152932 A1 | 6/2010 | Das |
| 2010/0198433 A1* | 8/2010 | Fortier .................. G01C 23/00 701/14 |
| 2012/0069131 A1* | 3/2012 | Abelow .............. G06Q 10/067 348/14.01 |
| 2012/0083997 A1 | 4/2012 | Meador et al. |
| 2013/0106603 A1* | 5/2013 | Weast .................... G06F 1/163 340/539.11 |
| 2013/0317735 A1* | 11/2013 | Mann ................ G01C 21/3697 701/400 |
| 2014/0244009 A1* | 8/2014 | Mestas ............... A63B 24/0062 700/91 |
| 2015/0204675 A1* | 7/2015 | Albert ................. G08G 5/0039 701/400 |
| 2016/0012733 A1* | 1/2016 | Girardeau ........... G08G 5/0039 701/529 |
| 2016/0019794 A1 | 1/2016 | Dominic et al. |
| 2018/0096532 A1* | 4/2018 | Srivastav ............. G06T 19/006 |

* cited by examiner

SYSTEM AND METHOD FOR ADAPTIVE RENDERING MESSAGE REQUESTS ON A VERTICAL DISPLAY

BACKGROUND

Modern aircraft messaging systems, i.e. datalink systems, require pilots to navigate through many screens to select message types to send, e.g. to air traffic control and airline operations centers. Not only is this inefficient, but it also distracts the pilots from their primary duty of operating the aircraft. Accordingly, there is a need for a more efficient human interface for selecting and sending such messages, such as datalink messages.

SUMMARY

In one embodiment, a method is provided. The method comprises: obtaining data; generating complete travel plan; determining at least one of: one or more current travel conditions and one or more future travel conditions; automatically generating at least one proposed message based upon such at least one of one or more current travel conditions and one or more future travel conditions; rendering one icon, for each of the at least one proposed message, on a grid having a first axis specifying altitude and a second axis specifying one of distance and time; and wherein each of the at least one proposed message is configured to be at least one of selectable, reviewable, editable, printable, and sendable.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
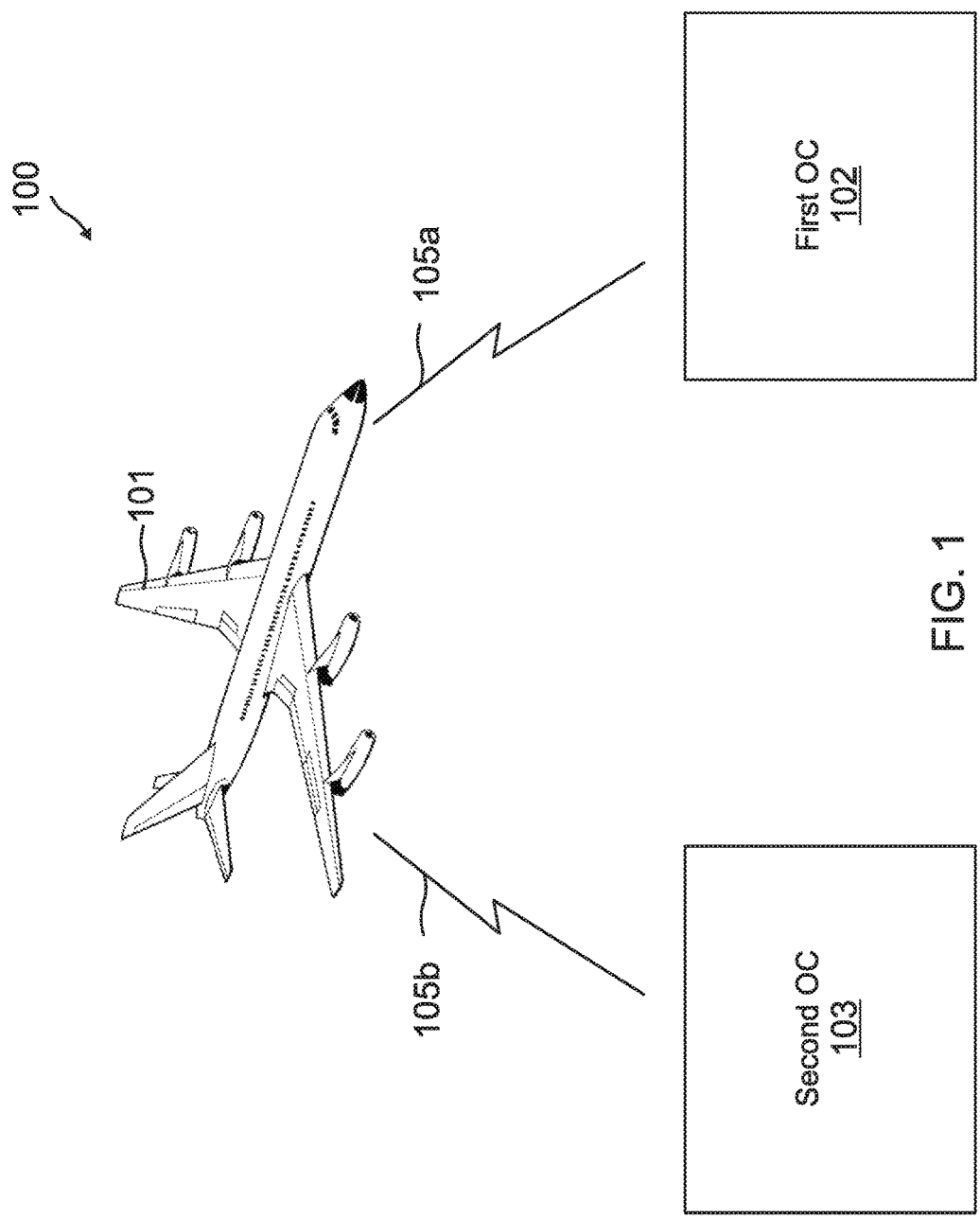
FIG. 1 is a block diagram of an exemplary system including operations centers, and a vehicle with a vertical display on which one icon for each proposed message are rendered.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding background and summary, or the following detailed description.

For pedagogical purposes, a vehicle may be described hereinafter as an aircraft. However, it is understood that the teachings herein are applicable to other types of vehicles including without limitation space craft, ships, automobiles, buses, trains, and any other vehicle. Thus, a pilot of an aircraft is more generically referred to as an operator of a vehicle 101. An airline is more generically referred to as an owner (which may include a leasee) of a vehicle. A flight plan of an aircraft is more generically referred to as a travel plan of the vehicle.

In one embodiment, data is obtained from a variety of sources within and external to the vehicle. At least one current and/or future travel condition, e.g. arising in or during the complete or modified travel path (such as intersecting weather, vehicle traffic, obstacles, opportunity for enhanced efficiency (e.g. travel time for example due to shortened travel path), and/or opportunity for diminished cost (e.g. diminished fuel consumption for example due to shortened travel path or reduced speed), and vehicle traffic control commands) of the vehicle are automatically determined. From such travel condition(s) and traffic, proposed message(s), which operator(s) of the vehicle may want to communicate, e.g. to a vehicle control center and/or a vehicle traffic control center, are automatically generated. Proposed messages, for example, include:

(a) request messages, that can be sent to a vehicle control center (such as an air traffic control center), requesting a change in the travel profile of the vehicle or information such as a weather report. For example, for an aircraft, such message(s) can be requests to change the flight profile, such as altitude, of an aircraft; and (b) reporting messages, e.g. stating vehicle location or local weather whether or not requested by a vehicle traffic controller.

In another embodiment, the current phase of travel is determined when at least one travel condition is determined.

In one embodiment, the proposed message(s) are only sent upon an operator of the vehicle taking an action, further described below, to send the message. In another embodiment, the vehicle operator may be able to edit a proposed message before sending it.

Proposed message(s) are automatically generated based upon conditions determined from a variety of data created within the vehicle and received from sources outside of the vehicle. The data may include real time and/or non-real time data. The proposed message(s) may change over time or distance based upon changes in the data, and thus the conditions.

In one embodiment, the icons, or symbols, corresponding to the proposed message(s) are rendered on a two-dimensional vertical display whose X-axis corresponds to time (or possibly distance), and the Y-axis corresponds to altitude. However, in another embodiment, the Y-axis corresponds to time (or possibly distance), and the X-axis corresponds to altitude.

In one embodiment, proposed message(s) that are untimely, e.g. a message that is no longer desirable, applicable, and/or practical, are automatically removed from the vertical display. In another embodiment, the time shown on the Y-axis changes as actual time passes, e.g. during the travel of the vehicle. However, in a further embodiment, where the X-axis (or alternatively Y-axis) intersects the Y-axis (or alternatively, respectively the X-axis) may not be instant time, but a future time. In yet another embodiment, an icon representing the vehicle is rendered on the vertical display to show where the vehicle is located, e.g. in time or distance, and altitude.

The icons can be activated, e.g. by pressing on them with a stylus or a finger when the vertical display includes a touch screen, or by pointing and clicking on them with a cursor control device. When an icon is activated the underlying proposed message is accessed and displayed, e.g. for review, and can be sent. In one embodiment, the proposed message can also be edited.

In one embodiment, icons are rendered, on the vertical display, for proposed message(s) for all future phases of travel of the vehicle. In another embodiment, icons are rendered, on the vertical display, for proposed message(s) for a single phase of travel, e.g. departure, cruise, or arrival, when, for example, an operator of the vehicle selects an icon on the vertical display corresponding to that phase of travel. In a further embodiment, the single phase of travel may be automatically selected based upon time and/or the location of the vehicle.

The aforementioned format reduces the number of actions that the operator of a vehicle must undertake to generate and send a message. As a result, the operator is less distracted, can better concentrate on controlling the vehicle, and thus can operate the vehicle in a safer manner.

In one embodiment, the provision of proposed message(s) is provided on a subscription basis from a location remote to the vehicle. Thus, for example, the owner or operator of a vehicle pays a subscription fee periodically to a service provider to be a subscriber so that the vehicle receives data.

Embodiments for implementing such techniques will now be described. FIG. 1 is a block diagram of an exemplary system 100 including operations centers, and a vehicle 101 with a vertical display on which one icon for each proposed message are rendered. In one embodiment, a first operations center (OC) 102 is an air traffic control center that provides instructions to the vehicle 101, and receives requests and reports from the vehicle. In another embodiment, the first operations center 102 may provide other data to the vehicle 101. In a further embodiment, a second operations center (OC) 103 is an airline operations center or a service provider operations center that provides data to the vehicle 101. In yet another embodiment, the second operations center (OC) 103 provides proposed message(s) to the vehicle, e.g. on a subscription basis.

The vehicle 101 and the first operations center 102 communicate with one another through at a first communications link 105a. The vehicle 101 and the second operations center 103 communicate with one another through a second communications link 105b. Each of the first communications link 105a and the second communications links 105b may be one or more of an HF, VHF, satellite, cellular network, WiFi, WiMax, AeroMACS, and/or any other type of communications links. In one embodiment, the first communications link 105a and/or the second communications links 102b are secure communications links, e.g. using encryption, such as with a virtual private network. The secure communications link reduces the risk of another party deleteriously manipulating or mimicking data communicated between the vehicle 101 and the corresponding operations center(s).

In one embodiment, the data provided by the operation center(s) to the vehicle 101 is used to generate proposed message(s). In another embodiment, such data may be a variety of types of data originating from a variety of sources as will be illustrated below. In a further embodiment, the data is or includes proposed message(s) generated by the at least one operations center 102.

The vehicle 101 is configured to transmit data, e.g. about the vehicle 101 and its surrounding environment, to the second operations center 103 through the communications link 105b. In one embodiment, the data is used by the second operations center 103 to generate proposed message(s) to be sent to the vehicle 101.

Figure 2:
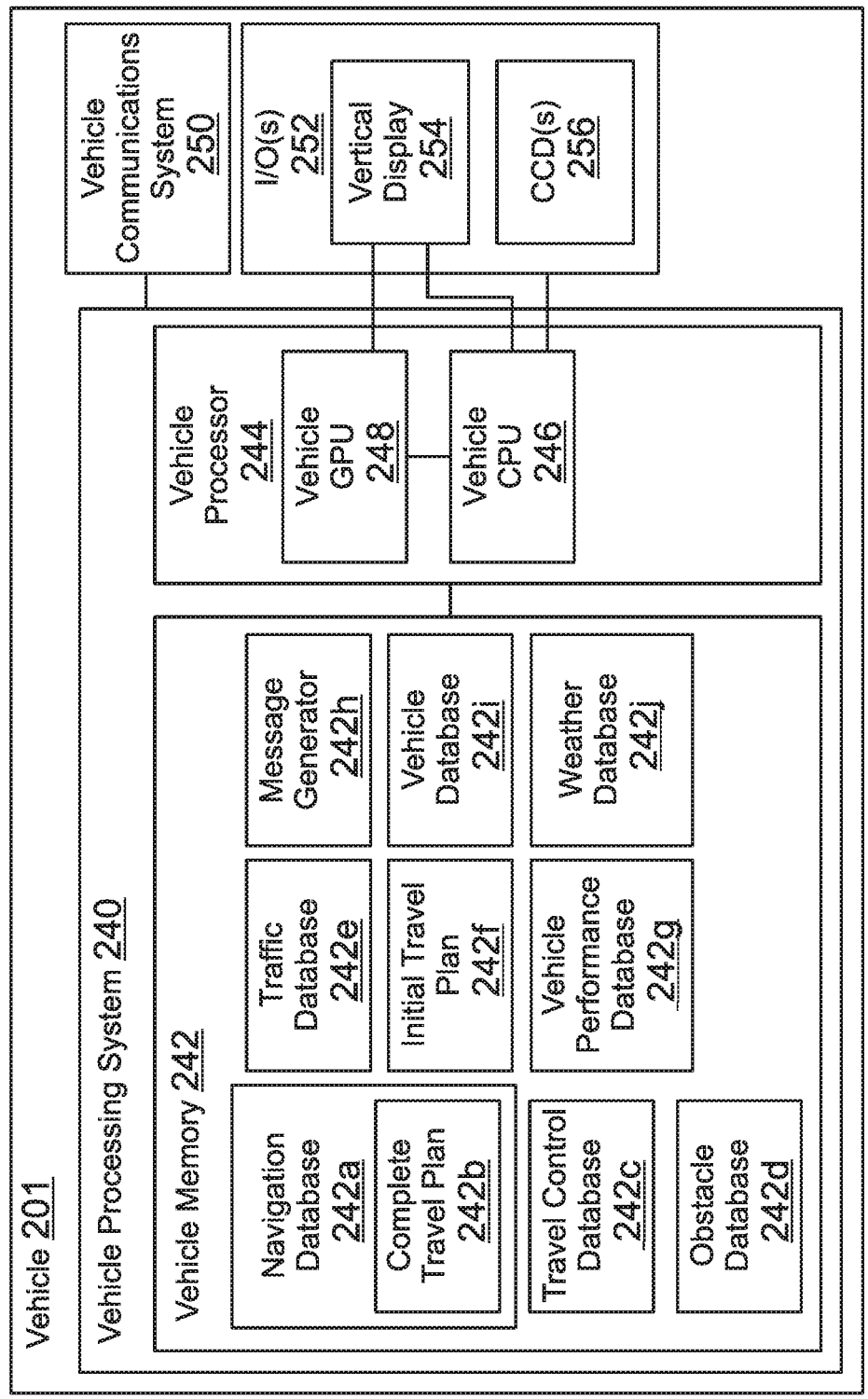
FIG. 2 illustrates an exemplary embodiment of a vehicle with a vertical display on which one icon for each proposed message are rendered.

FIG. 2 illustrates an exemplary embodiment of a vehicle 201 with a vertical display 254 on which one icon for each proposed message are rendered. The vehicle 201 includes a vehicle processing system 240 coupled to a vehicle communications system 250 and at least one input/output interface (I/O(s)) 252. The at least one input/output interface 252 is also known as at least one human machine interface. In one embodiment, the vehicle processing system 240 is part of one or more of: a flight management computer (FMC), a flight management system (FMS), a communications management unit (CMU), and a communications management function (CMF).

The vehicle communications system 250 is configured to receive and/or transmit data respectively from and to the first operations center 102 and/or the second operations center 103, e.g. as described above. In one embodiment, such data is respectively conveyed to and from the vehicle processing system 240. The vehicle communications system 250 comprises satellite, HF, VHF, cellular network, WiFi, WiMax, AeroMACS, and/or any other type of communications system, including transceivers and antennas as appropriate.

In one embodiment, the at least one input/output interface 252 is used to display and select proposed message(s) as described above. In another embodiment, the at least one input/output interface 252 may be used to edit the proposed messages. In a further embodiment, the at least one input/output interface 252 may be used to enter, edit, send, and/or display other types of data, e.g. proposed messages which can be sent to the first operations center 102.

The at least one input/output interface 252 includes a vertical display 254 that is used to render icon(s) corresponding to proposed message(s) as described above. In one embodiment, the vertical display 254 uses a touch screen which the operator of the vehicle 201 can touch, e.g., to make selections, enter, and/or edit data. In another embodiment, the at least one input/output interface 252 includes at least one cursor control device (CCD(s)) 256 which the operator of the vehicle 201 can use, e.g., to make selections, and/or enter and/or edit data. In a further embodiment, both a touch screen and at least one cursor control device 256 are utilized. Thus, for example, the operator can select proposed messages to send by touching or clicking on the correspondingly rendered icons. In yet another embodiment, the at least one cursor control device 256 and/or the touch screen include a keyboard.

In one embodiment, the vehicle processing system 240 includes a vehicle memory 242 coupled to a vehicle processor 244. In another embodiment, the vehicle processor 244 includes a vehicle central processing unit (CPU) 246 coupled to a vehicle graphics processor unit (GPU) 248. The vehicle GPU 248 is coupled to the at least one input/output interface 252, and the vertical display 254, to provide graphical data to be rendered as images on the display. The vehicle CPU 246 is coupled to the at least one input/output interface 252. In a further embodiment, the vehicle CPU 246 is coupled to vertical display 254, e.g. when the vertical display 254 includes a touch screen. In yet another embodiment, the vehicle CPU 246 is coupled to the cursor control device 256.

The vehicle processing system 244, e.g. the vehicle CPU 246, selects and processes the subsequently described data stored in the vehicle memory 242 (and/or elsewhere), and executes a message generator 242g that generates proposed messages. The proposed message(s) are generated based upon current and/or expected future travel condition(s) of the vehicle, e.g. the complete or modified travel plan, in addition to intersecting weather, vehicle traffic, obstacles, and/or vehicle traffic control commands.

The vehicle processing system 244, e.g. the vehicle GPU 248, converts the proposed messages (and/or other data) into a graphical data to be rendered on the vertical display 254. In a further embodiment, the vehicle processing system 240 may be implemented, in whole or in part, with a state machine or a field programmable gate array.

In one embodiment, the vehicle memory 242 includes a navigation database 242a, a travel control database 242c, an obstacle database 242d, a traffic database 242e, an initial travel plan 242f, a vehicle performance database 242g, a message generator 242h, vehicle data 242i, and/or a weather database 242j. In another embodiment, one or more of the databases, complete travel plan 242b, and message generator 242h are part of an airline operations control or communications (AOC) configuration database used to configure message definitions, configure message trigger logic, and specify data used in messages. In a further embodiment, the navigation database 242a includes a complete travel plan 242b; however, the complete travel plan 242b can be stored elsewhere, e.g. in the vehicle memory 242. In yet another embodiment, the navigation database 242 is a dynamic database that includes a conventional navigation mapping information and/or route guidance system. In yet a further embodiment, the initial travel plan can be stored in the navigation database 242a. The databases as used herein may be databases in the conventional sense, or any other means of storing data in memory such as for example data files.

The vehicle performance database 242g includes characteristics of the vehicle 201. Such characteristics of the vehicle 201 may include range, gross and empty weight, rate of climb, fuel capacity, maximum speed, and fuel burn rate. For aircraft, it may include ground roll at takeoff and landing, and typical indicated airspeed or true airspeed, e.g. at different flight levels.

The initial travel plan 242f stores data corresponding to the initial travel plan submitted by the operator of the vehicle 201. For example, for an aircraft, the aircraft operator, i.e. pilot, or airline submits the initial travel plan 230, i.e. an initial flight plan, to the US Federal Aviation Administration (FAA). In one embodiment, the initial travel plan is entered by the vehicle operator. In another embodiment, the initial travel plan is obtained from a datalink or clearance message, or an information management system such as the US Federal Aviation Administration's (FAA's) System Wide Information Management (SWIM) system.

In one embodiment, the initial travel plan 242f includes an identifier of the vehicle 201, information about the vehicle 201 (e.g. manufacturer and type of vehicle 201, color and any special equipment on the vehicle 201), expected speed of the vehicle 201, departure location (or departure terminal) and time, information about travel path (e.g. cruising altitude, airways, and checkpoints), and arrival location(s) (or destination(s) or terminal(s)), estimated time en route, fuel on board, alternate arrival locations (or destination(s) or terminal(s)) in case of inclement weather, type of travel (e.g. for aircraft whether instrument flight rules (IFR) or visual flight rules (FR) apply), information about the operator of the vehicle 201 (e.g. pilot), and number of people on board the vehicle 201.

The navigation database 242a includes algorithms for generating the complete travel plan 242b based upon the initial travel plan 242f, the vehicle performance database 242g, and possibly the travel control database 242c, the obstacle database 242d, the traffic database 242e, the vehicle database 242i, and the weather database 242j. The complete travel plan 242b specifies, with respect to time, the expected three-dimensional position (or location) and other parameters (e.g. vector velocity, fuel consumption, elapsed time, time to destination, and fuel remaining) of the vehicle 201 at all times during prospective travel. In one embodiment, generation of the complete travel plan 242b occurs prior to commencement of the travel plan, i.e. departure, of the vehicle 201.

Further, as exigencies or opportunities arise e.g. due to changes in weather, other vehicle traffic, obstacles, guidance from vehicle traffic control, and/or opportunities to reduce travel time or cost, the complete travel plan 242b may have to be modified. A modified complete travel plan is then generated using the same databases, and stored, e.g. in the navigation database 242a. Modifications to a travel plan may require generating new proposed messages with the message generator 242h, e.g. based upon economic, efficiency and/or safety based considerations. In one embodiment, such deviations from the planned route may be initiated only after selecting and sending corresponding proposed message(s), e.g. to the first operations center 102, and receiving approval for the request(s) in such message(s).

In one embodiment, some or all steps of the complete travel plan 242b, or modified complete travel plan, occur only upon operator selection and transmission, and approval, e.g. by the first operations center 102 (e.g. an air traffic control center), of corresponding proposed messages. In another embodiment, verification that some steps of the complete travel plan 242b, or of the modified complete travel plan, have been executed are also confirmed by the operator selecting and sending corresponding proposed messages, e.g. to the first operations center 102.

Sources of exigencies which may cause deviations to the complete travel plan include notices from an operations center 102 such as a vehicle control center, changing weather, newly identified obstacles, changing vehicle data (such as a decline in fuel remaining), and/or proximity to newly identified other vehicles. The travel control database 242c includes data that are requests from vehicle traffic control centers (e.g. to confirm altitude and/or speed), notices (e.g. Notices to Airmen or NOTAM and temporary flight restrictions), approved reduced vertical separation minimum distances, and/or other data, e.g. as issued by a data link—automatic terminal information service (D-ATIS). The obstacle database 242d includes potential obstacles to travel of the vehicle 201, for example, identified by a terrain awareness warning system on the vehicle 201.

The traffic database 242e includes data that is geographical location data with respect to time for other vehicles which are expected to be proximate to the vehicle 201 along its path of travel. Sources of traffic data for other vehicles may include vehicle traffic control center(s), automatic dependent surveillance—broadcast (ADS-B) transmissions from the other vehicle(s), vehicle traffic collision avoidance system(s), and/or databases such as the US Federal Aviation Administration's System Wide Information Management system. The vehicle database 242i includes data about the vehicle 201, e.g. measured by sensors on the vehicle 201, such rate of fuel consumption, remaining fuel, vector velocity, and geographic location, e.g. in three dimensions.

In one embodiment, the weather database 242j includes geographical location with respect to time for weather conditions proximate to the path of travel of the vehicle 201. In another embodiment, weather conditions include data about wind vector velocity, wind shear, clouds, precipitation (e.g. rain and ice), and/or lightening. Such weather information may originate from terminal weather information for pilots, on-board aircraft sensors such as weather radar, and remote databases such as an information management system like the US FAA's SWIM system. The weather database 242j may also include at least one weather model which can predict future weather based on current and/or past weather conditions.

Figure 3:
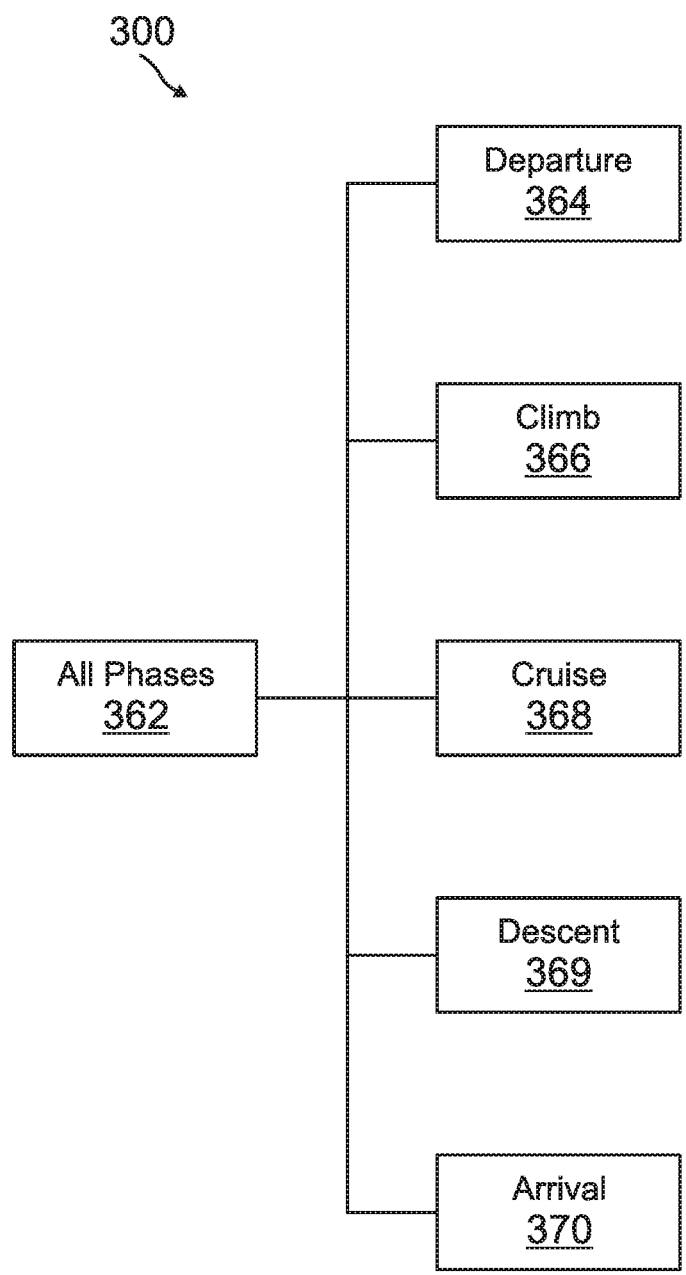
FIG. 3 illustrates an exemplary flow chart of views using a vertical display.

FIG. 3 illustrates an exemplary flow chart 300 of views using the vertical display 254. Initially, all selections for all phases of travel 362 are shown on. In one embodiment, icons corresponding to position based, time based, altitude based, speed based, and/or offset based proposed message are rendered on the vertical display 254 for all phases of travel. However, icons pertaining to other types of data are contemplated.

In one embodiment, the phases are departure 364, climb 366, cruise 368, descent 369, and arrival 370. However, the operator of the vehicle 201 can select one of these phases, and any position based, time based, altitude based, speed based, and offset based proposed message shown for that phase of travel.

Position based proposed messages are proposed messages related to latitude and longitude. Time based proposed messages are proposed messages related to time. Altitude based proposed messages are proposed messages related to altitude. Speed based proposed messages are proposed messages related to vehicle speed. Offset based proposed messages are proposed messages related to an offset in distance for a new vehicle path parallel to the original vehicle path, e.g. used to avoid turbulence from a nearby vehicle.

Figure 4:
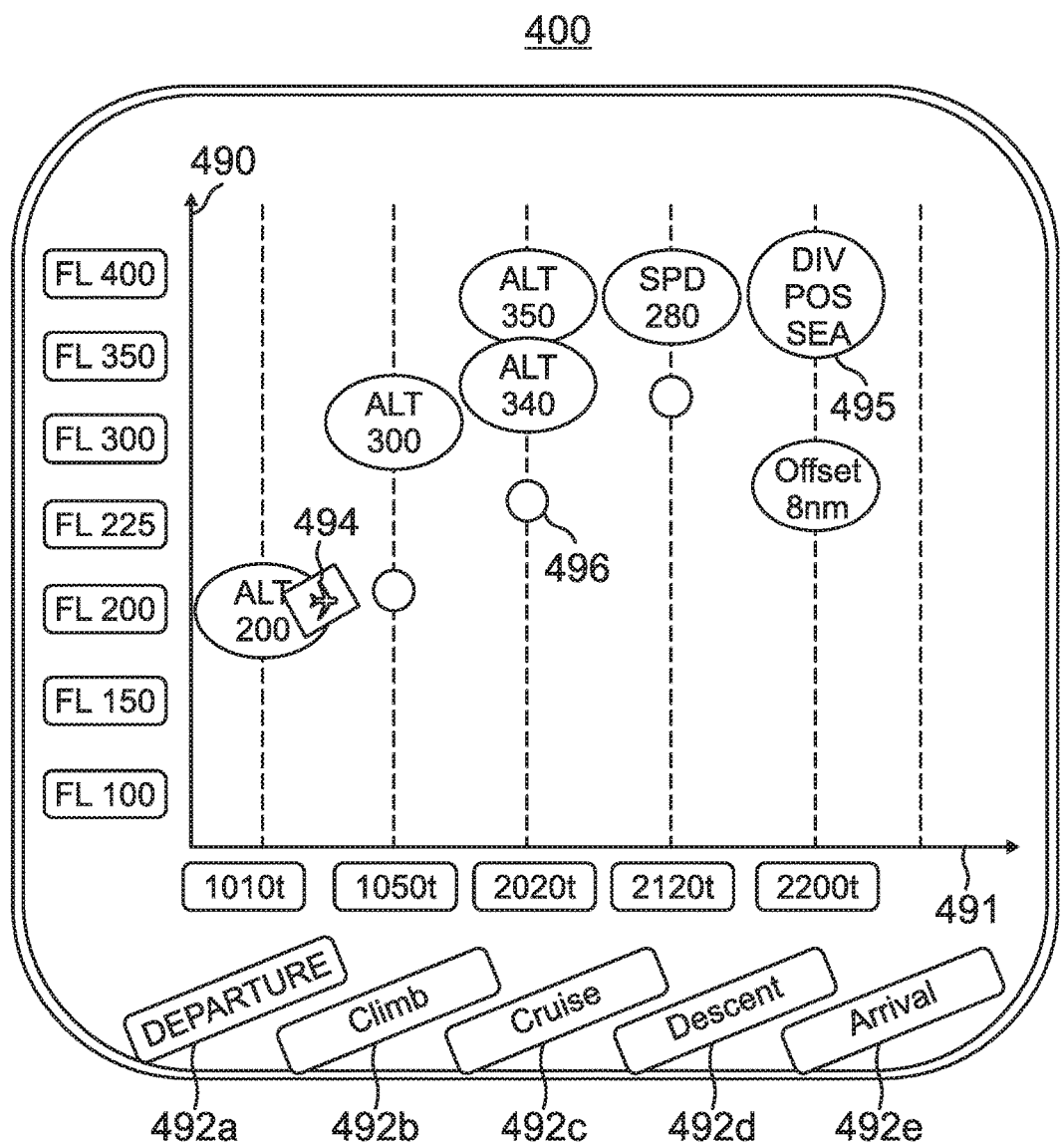
FIG. 4 illustrates an exemplary rendered image on a vertical display for all phases of travel.

FIG. 4 illustrates an exemplary rendered image 400 on a vertical display 254 for all phases of travel. In this embodiment, the X-axis 490 corresponds to time of travel of the vehicle 201 (e.g. 1010 hours to 2200 hours), and the Y-axis 491 corresponds to altitude, e.g. 10,000 to 40,000 feet. The position of the vehicle 201 is illustrated by the aircraft icon 494. The oval icons 495 indicate proposed messages which correspond to actions that can be taken at corresponding times and altitudes where the ovals are located on the rendered image. Thus, the vehicle 201 can send a message requesting that it increase altitude to 30,000 feet at 1050 hours, change speed to 280 miles per hour at about 2040 hours, and divert to Seattle airport at 2140 hours. If vehicle traffic control authorizes any of such requests, the vehicle 201 can affect the corresponding action.

The round icons 496 indicate proposed messages reporting vehicle travel data at the corresponding times based upon a vehicle traffic control request or initiated by the operator(s) of the vehicle 201. The icons may have different colors indicating which proposed messages are mandatory, i.e. requested from an operations center, e.g. an air traffic control center or an airline operations center, and which proposed messages are optional to send. The departure icon 492a, climb icon 492b, cruise icon 492c, descent icon 492d, and arrival icon 492e can be selected by the operator of the vehicle 201 to display the time and icons for that phase of travel.

Figure 5:
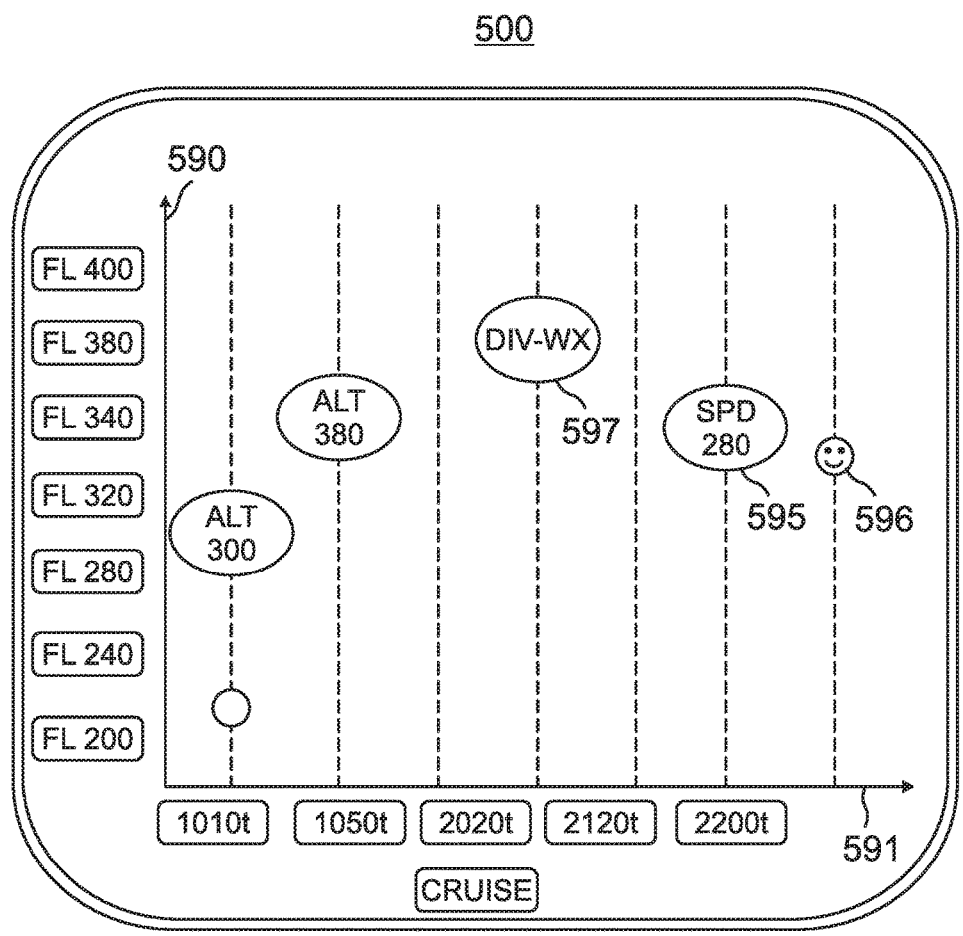
FIG. 5 illustrates an exemplary rendered image on a vertical display for a cruise phase.

FIG. 5 illustrates an exemplary rendered image 500 on a vertical display 254 for the cruise phase. In this embodiment, the X-axis 590 corresponds to time of travel of the vehicle 201 (e.g. 1010 hours to 2200 hours), and the Y-axis 591 corresponds to altitude, e.g. 10,000 to 40,000 feet. Similar round icons 596 and oval icons 595 are illustrated. For example, by sending the proposed message corresponding to oval icon 597, the operator(s) of the vehicle 201 can request that the vehicle 201 be diverted at about 1120 hours due to inclement weather. In one embodiment, the vehicle processing system 240 automatically determines the phase of travel of the vehicle 201 to be displayed. In another embodiment, the vehicle processing system 240 automatically renders on the vertical display 254 such phase.

Figure 6:
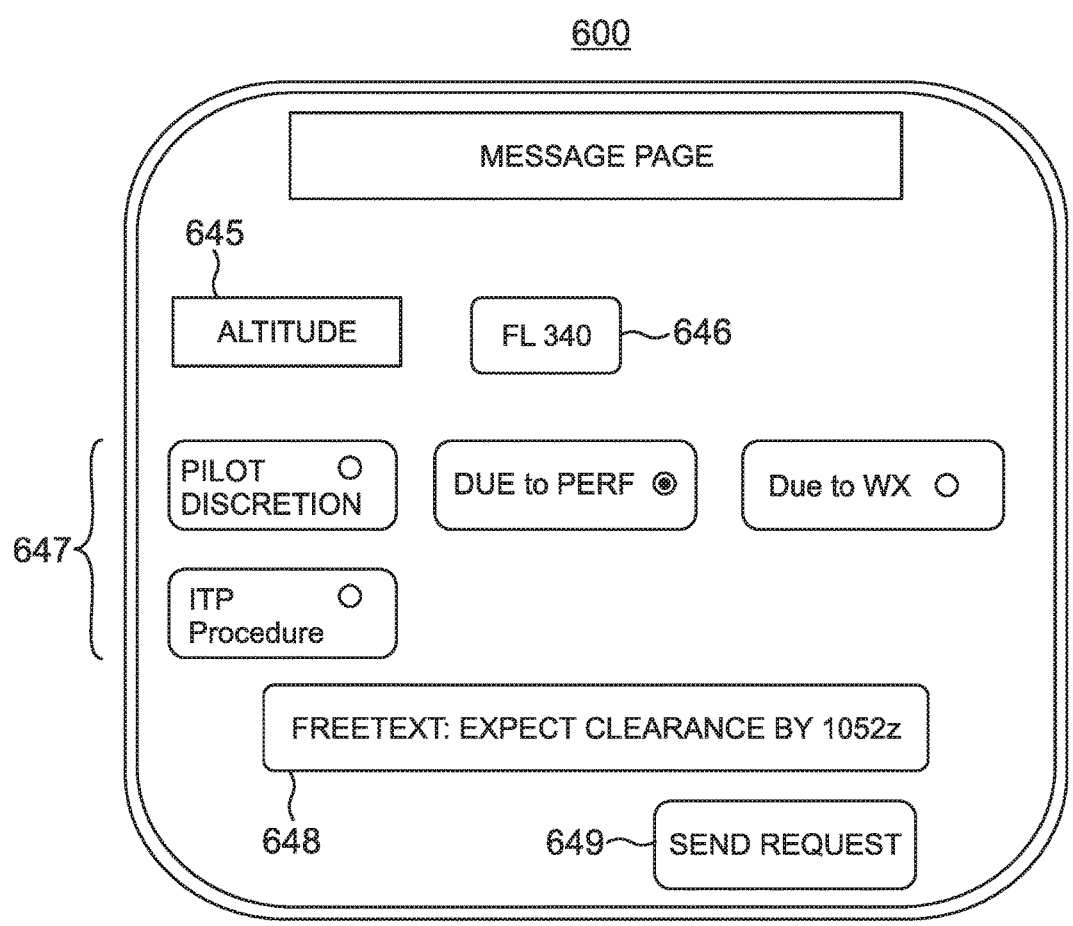
FIG. 6 illustrates an exemplary rendered proposed message.

FIG. 6 illustrates an exemplary rendered proposed message 600 which is accessed when the operator of the vehicle 201 presses or clicks on the corresponding icon. In this example, a change of altitude to 34,000 feet is requested due to increased travel performance (such as facilitating an earlier arrival time if the request in the message is granted), and that clearance is expected by 1052 hours UTC (or Zulu time). The subject of the proposed message, e.g. change of altitude is shown in a first box 645. The parameter of the subject, e.g. altitude, is shown in a second box 646. The reason for the request, e.g. to increase travel performance, is shown in a third box 647. In the illustrated example, numerous reasons for the request are shown. In one embodiment, the proposed message may have a suggested reason for the request; however, the operator can select a different reason depending upon the circumstance. In another embodiment, clarifying text, e.g. when the answer to the request is expected, is automatically included by the vehicle processing system 240 and can be edited by the operator, or alternatively inserted by the operator.

Figure 7:
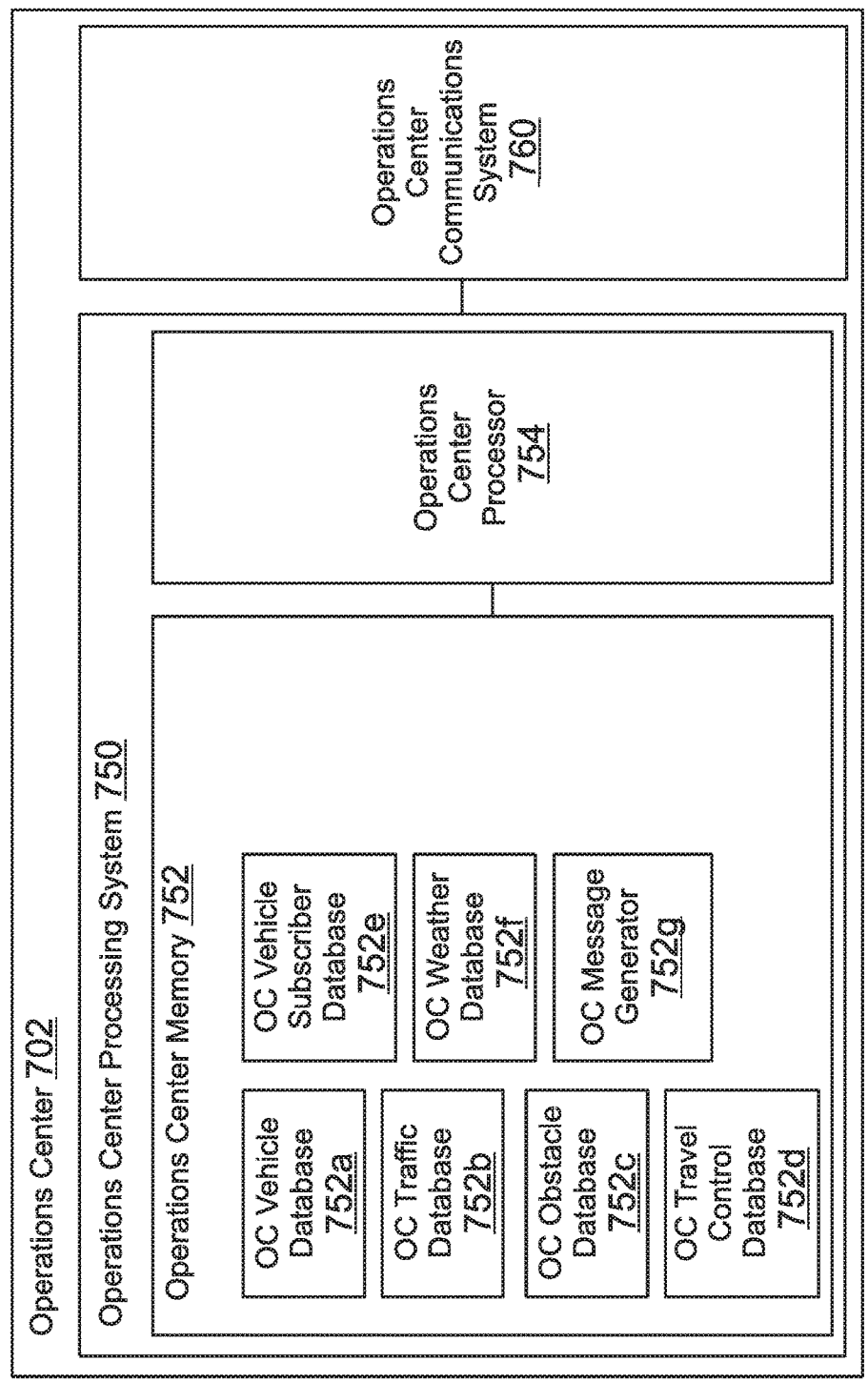
FIG. 7 illustrates one embodiment of an operations center.

FIG. 7 illustrates one embodiment of an operations center 702. In this embodiment, the operations center 702 includes an operations center processing system 750 coupled to an operations center communications system 760. The operations center communications system 760 comprises satellite, HF, VHF, cellular network, WiFi, WiMax, AeroMACS, and/or any other type of communications system, including transceivers and antennas as appropriate. The operations center communications system 760 facilitates communications through a communications link between the vehicle 101 and the operations center 702. In one embodiment, the operations center 702 transmits to the vehicle 101 proposed messages to be rendered, e.g. with icons, on the vertical display 254 of the vehicle 101.

In one embodiment, the operations center processing system 750 includes an operations center memory 752 coupled to an operations center processor 754. In another embodiment, the operations center processing system 750 may be implemented, in whole or in part, with a state machine or a field programmable gate array.

In one embodiment, the operations center processing system 750, e.g. the operations center processor 754, selects data stored in the operations center memory 752 such as in the subsequently described databases (and/or elsewhere). An operations center message generator 742g generates proposed messages in a manner as otherwise described herein.

In one embodiment, the operations center memory 752 includes an operations center (OC) vehicle database 752a, an operations center (OC) traffic database 752b, an operations center (OC) obstacle database 752c, an operations center (OC) travel database 752d, an operations center (OC) subscriber database 752e, an operations center (OC) weather database 752g, and an operations center (OC) message generator 752h. The databases as used herein may be databases in the conventional sense, or any other means of storing data in memory such as for example data files.

In one embodiment, the operations center vehicle database 752a includes complete and modified complete travel plans of the vehicles to which the operations center is sending proposed messages. In another embodiment, the operations center vehicle database 752a includes data for each of such vehicles, e.g. measured by the vehicle sensors on the vehicle. In a further embodiment, such data includes remaining fuel of each vehicle.

In one embodiment, the operations center vehicle database 752a includes vehicle performance databases for each of such vehicles, and determines, as described above, the complete and modified complete travel plans. Alternatively, in a further embodiment, the complete and modified complete travel plans are obtained elsewhere, e.g. through an information management system such as the US Federal Aviation Administration System Wide Information Management system.

In one embodiment, sources of exigencies which may cause deviations to the complete travel plan, such as those described above are found in the operations center vehicle database 752a, the operations center traffic database 752b, the operations center obstacle database 752c, the operations travel control database 752d, and/or the operations center weather database 752f The operations center traffic database 752b, the operations center obstacle database 752c, the operations travel control database 752d, and the operations center weather database 752f contain information, as described above for their counterparts in the vehicle processing system 240 but for the travel paths of one or more vehicles.

In one embodiment, operations center subscriber database 752e includes identifiers, e.g. aircraft tail numbers, corresponding to the vehicles 101, operators, e.g. pilots, of the vehicles 101, and/or owners, e.g. airlines, of the vehicles 101 that subscribe to the services provided by the operations center 102. In another embodiment, the operations center subscriber database 752e is only used when the services of the operations center 102 are provided on a subscription basis, e.g. where subscribers pay a periodic payment to obtain such services. Thus, only subscribers are capable of receiving proposed messages generated by the operations center transmitted to their vehicles to be rendered on the vertical display 254 in the vehicle 101. In a further embodiment, the operations center subscriber database 742e is part of the operations center vehicle database 752a. The message generator 752g generates proposed messages based upon the complete travel plan 242b, or as exigencies arise based on modifications to the complete travel plan 242b, e.g. which must be reported and/or approved by others such as a vehicle control center.

Figure 8:
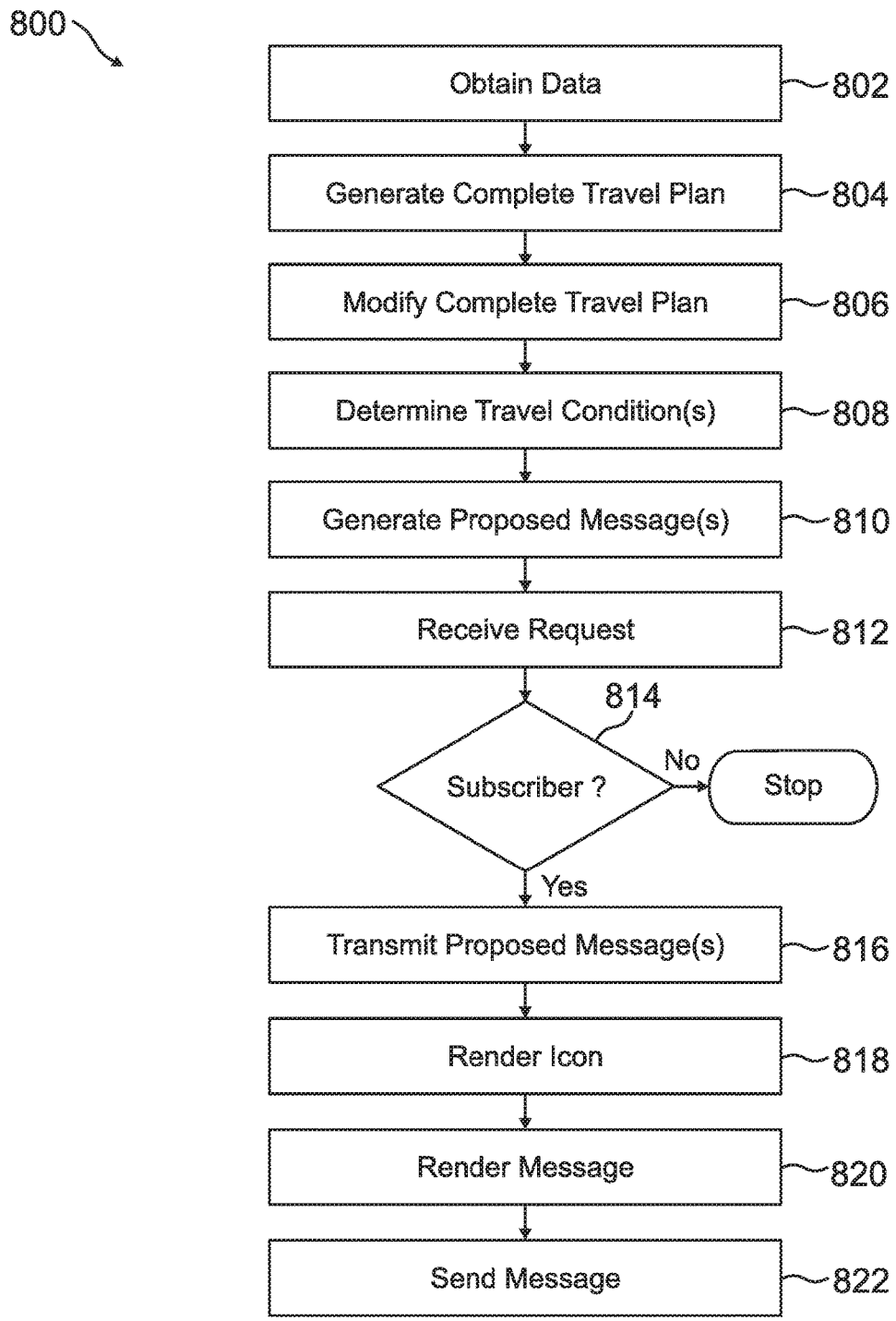
FIG. 8 illustrates one embodiment of a method for generating proposed messages.

FIG. 8 illustrates one embodiment of a method 800 for generating proposed messages. To the extent that the embodiment of method 800 shown in FIG. 8 is described herein as being implemented in the systems shown in FIGS. 1 through 7, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In one embodiment, in block 802, data is obtained, e.g. by a vehicle sensor and/or from other sources, such as an operations center and an information management system such as the US FAA's SWIM system. In block 804, a complete travel plan is generated, e.g. as described above. In one embodiment, in block 806, the complete travel plan is modified, e.g. as described above.

In block 808, at least one current and/or future travel conditions of a vehicle 101 are determined, e.g. automatically, based upon the complete or modified travel plan and the data. In one embodiment, such travel conditions include conditions (exemplified above) identified in the traffic database, travel control database, weather database, and/or obstacle database which are expected to be proximate to the path of travel of the vehicle 101.

In block 810, at least one proposed message is automatically generated, e.g. by a message generator, based upon the complete or modified travel plan, and the at least one travel conditions. In another embodiment, in block 812, receive a request from a vehicle 101 for automatically generated messages. In a further embodiment, in block 814, determine if the vehicle 101 is a subscriber. In block 816, if the vehicle 101 is a subscriber, transmit proposed message(s) to the vehicle 101. If the vehicle 101 is not a subscriber, then do not transmit proposed messages(s) to the vehicle 101, e.g. stop.

In block 818, render one icon, for each of the at least one proposed message, on a grid, e.g. having an X-axis corresponding to one of time and distance, and a Y-axis corresponding to altitude. In one embodiment, render icons for all phases of travel. In another embodiment, render the icons only for a selected phase of travel. In a further embodiment, automatically render icons for the current phase of travel. In yet another embodiment, each of the at least one proposed message is configured to be at least one of selectable (e.g. by clicking on or touching the corresponding icon), reviewable, printable, editable, and sendable.

In block 820, render, e.g. on the vertical display, a message corresponding to a selected icon. In one embodiment, edit the message corresponding to the selected icon. In block 822, send the message corresponding to the selected icon.

EXAMPLE EMBODIMENTS

Example 1 includes a vehicle processing system, comprising: a vehicle processor; a vehicle memory coupled to the vehicle processor; wherein the vehicle memory comprises at least one of: a navigation database; a travel control database; an obstacle database; a traffic database; a vehicle performance database; a vehicle database; and a weather database; wherein the vehicle memory further comprises a message generator; wherein the vehicle memory is configured to receive an initial travel plan; wherein the vehicle processing system is configured to generate a complete travel plan from the initial travel plan; and wherein the vehicle processing system is configured to: determine at least one travel condition of a vehicle; automatically generate at least one proposed message based upon at least one of the at least one travel condition; render one icon, for each of the at least one proposed message, on a grid having a first axis specifying altitude and a second axis specifying one of distance and time; and wherein each of the at least one proposed message is configured to be at least one of selectable, reviewable, printable, editable, and sendable.

Example 2 includes the vehicle processing system of Example 1, wherein the vehicle processor further comprises a central processing unit coupled to a graphics processing unit.

Example 3 includes the vehicle processing system of any of Examples 1-2, wherein the navigation database is configured to generate the complete travel plan from the initial travel plan using at least the vehicle performance database.

Example 4 includes the vehicle processing system of any of Examples 1-3, wherein the travel control database includes data that is at least one of: requests from vehicle traffic control centers, Notices to Airmen, temporary flight restrictions, approved reduced vertical separation minimum distances, and data issued by a data link—automatic terminal information service.

Example 5 includes the vehicle processing system of any of Examples 1-4, wherein the traffic database includes data, that is geographical location data with respect to time for other vehicles expected to be proximate to the path of travel of the vehicle, from at least one of the following sources: at least one vehicle traffic control center, at least one automatic dependent surveillance—broadcast (ADS-B) transmission, at least one vehicle traffic collision avoidance system, and an information management system.

Example 6 includes the vehicle processing system of any of Examples 1-5, wherein the weather database includes geographical location data with respect to time for weather conditions expected to be proximate to the path of travel of the vehicle.

Example 7 includes the vehicle processing system of any of Examples 1-6, wherein the icon is rendered for one phase of travel of the vehicle.

Example 8 includes a vehicle, comprising: a vehicle communications system; at least one input/output interface comprising a vertical display; a vehicle processing system, coupled to the vehicle communications system and the at least one input/output interface, comprising: a vehicle processor; a vehicle memory coupled to the vehicle processor; wherein the vehicle memory comprises at least one of: a navigation database; a travel control database; an obstacle database; a traffic database; a vehicle performance database; a vehicle database; and a weather database; wherein the vehicle memory further comprises a message generator; wherein the vehicle memory is configured to receive an initial travel plan; wherein the vehicle processing system is configured to generate a complete travel plan from the initial travel plan; wherein the vehicle processing system is configured to: determine at least one travel condition of a vehicle; automatically generate at least one proposed message based upon at least one of the at least one travel condition; and render one icon, for each of the at least one proposed message, on a grid having a first axis specifying altitude and a second axis specifying one of distance and time and wherein each of the at least one proposed message is configured to be at least one of selectable, reviewable, printable, editable, and sendable.

Example 9 includes the vehicle of Example 8, wherein the vehicle processor further comprises a central processing unit coupled to a graphics processing unit.

Example 10 includes the vehicle of any of Examples 8-9, wherein the navigation database is configured to generate the complete travel plan from the initial travel plan using at least the vehicle performance database.

Example 11 includes the vehicle of any of Examples 8-10, wherein the travel control database includes data that is at least one of: requests from vehicle traffic control centers, Notices to Airmen, temporary flight restrictions), approved reduced vertical separation minimum distances, and/data issued by a data link—automatic terminal information service.

Example 12 includes the vehicle of any of Examples 8-11, wherein the traffic database includes data that is geographical location data with respect to time for other vehicles which are expected to be proximate to the path of travel of the vehicle from at least one of the following sources: at least one vehicle traffic control center, at least one automatic dependent surveillance—broadcast (ADS-B) transmission, at least one vehicle traffic collision avoidance system, and information management system.

Example 13 includes the vehicle of any of Examples 8-12, wherein the weather database includes geographical location data with respect to time for weather conditions expected to be proximate to the path of travel of the vehicle.

Example 14 includes the vehicle of any of Examples 8-13, wherein the icon is rendered for one phase of travel of the vehicle.

Example 15 includes the vehicle of any of Examples 8-14, wherein the at least one input/output interface includes at least one of: the vertical display with a touch screen and a cursor control device Example 16 includes a method, comprising: obtaining data; generating complete travel plan; determining at least one of: one or more current travel conditions and one or more future travel conditions; automatically generating at least one proposed message based upon the at least one of one or more current travel conditions and one or more future travel conditions; rendering one icon, for each of the at least one proposed message, on a grid having a first axis specifying altitude and a second axis specifying one of distance and time; and wherein each of the at least one proposed message is configured to be at least one of selectable, reviewable, printable, editable, and sendable.

Example 17 includes the method of Example 16, further comprising rendering a proposed message corresponding to a selected icon.

Example 18 includes the method of any of Examples 16-17, wherein rendering the one icon, for each of the at least one proposed message, on the grid comprises rendering the one icon, for each of the at least one proposed message for a selected phase of travel of the vehicle, on the grid.

Example 19 includes the method of any of Examples 16-18, wherein obtaining data further comprises obtaining data from at least one of a vehicle sensor and an operations center.

Example 20 includes the method of any of Examples 16-19, determining whether at least one vehicle is a subscriber.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:
1. A vehicle processing system, comprising:
a vehicle processor;
a vehicle memory coupled to the vehicle processor;
wherein the vehicle memory comprises at least one of:
 a navigation database;
 a travel control database;
 an obstacle database;

a traffic database;
a vehicle performance database;
a vehicle database; and
a weather database;
wherein the vehicle memory further comprises a message generator;
wherein the vehicle memory is configured to receive an initial travel plan;
wherein the vehicle processing system is configured to generate a complete travel plan from the initial travel plan; and
wherein the vehicle processing system is configured to:
determine at least one travel condition of a vehicle;
automatically generate at least one proposed message based upon at least one of the at least one travel condition, where the at least one proposed message is configured to be sent to a control center; and
render one icon, for each of the at least one proposed message, on a grid having a first axis specifying altitude and a second axis specifying one of distance and time, where message is configured to be displayed upon activation of a corresponding icon; and
wherein each of the at least one proposed message is configured to be, by an operator of a vehicle, at least one of reviewable, printable, editable, and sendable.

2. The vehicle processing system of claim 1, wherein the vehicle processor further comprises a central processing unit coupled to a graphics processing unit.

3. The vehicle processing system of claim 1, wherein the navigation database is configured to generate the complete travel plan from the initial travel plan using at least the vehicle performance database.

4. The vehicle processing system of claim 1, wherein the travel control database includes data that is at least one of: requests from vehicle traffic control centers, Notices to Airmen, temporary flight restrictions, approved reduced vertical separation minimum distances, and data issued by a data link—automatic terminal information service.

5. The vehicle processing system of claim 1, wherein the traffic database includes data, that is geographical location data with respect to time for other vehicles expected to be proximate to the path of travel of the vehicle, from at least one of the following sources: at least one vehicle traffic control center, at least one automatic dependent surveillance—broadcast (ADS-B) transmission, at least one vehicle traffic collision avoidance system, and an information management system.

6. The vehicle processing system of claim 1, wherein the weather database includes geographical location data with respect to time for weather conditions expected to be proximate to the path of travel of the vehicle.

7. The vehicle processing system of claim 1, wherein the icon is rendered for one phase of travel of the vehicle.

8. A vehicle, comprising:
a vehicle communications system;
at least one input/output interface comprising a vertical display;
a vehicle processing system, coupled to the vehicle communications system and the at least one input/output interface, comprising:
a vehicle processor;
a vehicle memory coupled to the vehicle processor;
wherein the vehicle memory comprises at least one of:
a navigation database;
a travel control database;
an obstacle database;
a traffic database;
a vehicle performance database;
a vehicle database; and
a weather database;
wherein the vehicle memory further comprises a message generator;
wherein the vehicle memory is configured to receive an initial travel plan;
wherein the vehicle processing system is configured to generate a complete travel plan from the initial travel plan;
wherein the vehicle processing system is configured to:
determine at least one travel condition of a vehicle;
automatically generate at least one proposed message based upon at least one of the at least one travel condition, where the at least one proposed message is configured to be sent to a control center; and
render one icon, for each of the at least one proposed message, on a grid having a first axis specifying altitude and a second axis specifying one of distance and time, where message is configured to be displayed upon activation of a corresponding icon; and
wherein each of the at least one proposed message is configured to be, by an operator of a vehicle, at least one of reviewable, printable, editable, and sendable.

9. The vehicle of claim 8, wherein the vehicle processor further comprises a central processing unit coupled to a graphics processing unit.

10. The vehicle of claim 8, wherein the navigation database is configured to generate the complete travel plan from the initial travel plan using at least the vehicle performance database.

11. The vehicle of claim 8, wherein the travel control database includes data that is at least one of: requests from vehicle traffic control centers, Notices to Airmen, temporary flight restrictions), approved reduced vertical separation minimum distances, and/data issued by a data link—automatic terminal information service.

12. The vehicle of claim 8, wherein the traffic database includes data that is geographical location data with respect to time for other vehicles which are expected to be proximate to the path of travel of the vehicle from at least one of the following sources: at least one vehicle traffic control center, at least one automatic dependent surveillance—broadcast (ADS-B) transmission, at least one vehicle traffic collision avoidance system, and information management system.

13. The vehicle of claim 8, wherein the weather database includes geographical location data with respect to time for weather conditions expected to be proximate to the path of travel of the vehicle.

14. The vehicle of claim 8, wherein the icon is rendered for one phase of travel of the vehicle.

15. The vehicle of claim 8, wherein the at least one input/output interface includes at least one of: the vertical display with a touch screen and a cursor control device.

16. A method, comprising:
obtaining data;
generating complete travel plan;
determining at least one of: one or more current travel conditions and one or more future travel conditions;
automatically generating at least one proposed message based upon the at least one of one or more current travel conditions and one or more future travel conditions, where the at least one proposed message is configured to be sent to a control center;

rendering one icon, for each of the at least one proposed message, on a grid having a first axis specifying altitude and a second axis specifying one of distance and time, where message is configured to be displayed upon activation of a corresponding icon; and wherein each of the at least one proposed message is configured to be, by an operator of a vehicle, at least one of reviewable, printable, editable, and sendable.

17. The method of claim 16, further comprising rendering a proposed message corresponding to a selected icon.

18. The method of claim 16, wherein rendering the one icon, for each of the at least one proposed message, on the grid comprises rendering the one icon, for each of the at least one proposed message for a selected phase of travel of the vehicle, on the grid.

19. The method of claim 16, wherein obtaining data further comprises obtaining data from at least one of a vehicle sensor and an operations center.

20. The method of claim 16, determining whether at least one vehicle is a subscriber.

* * * * *